Figure 1:
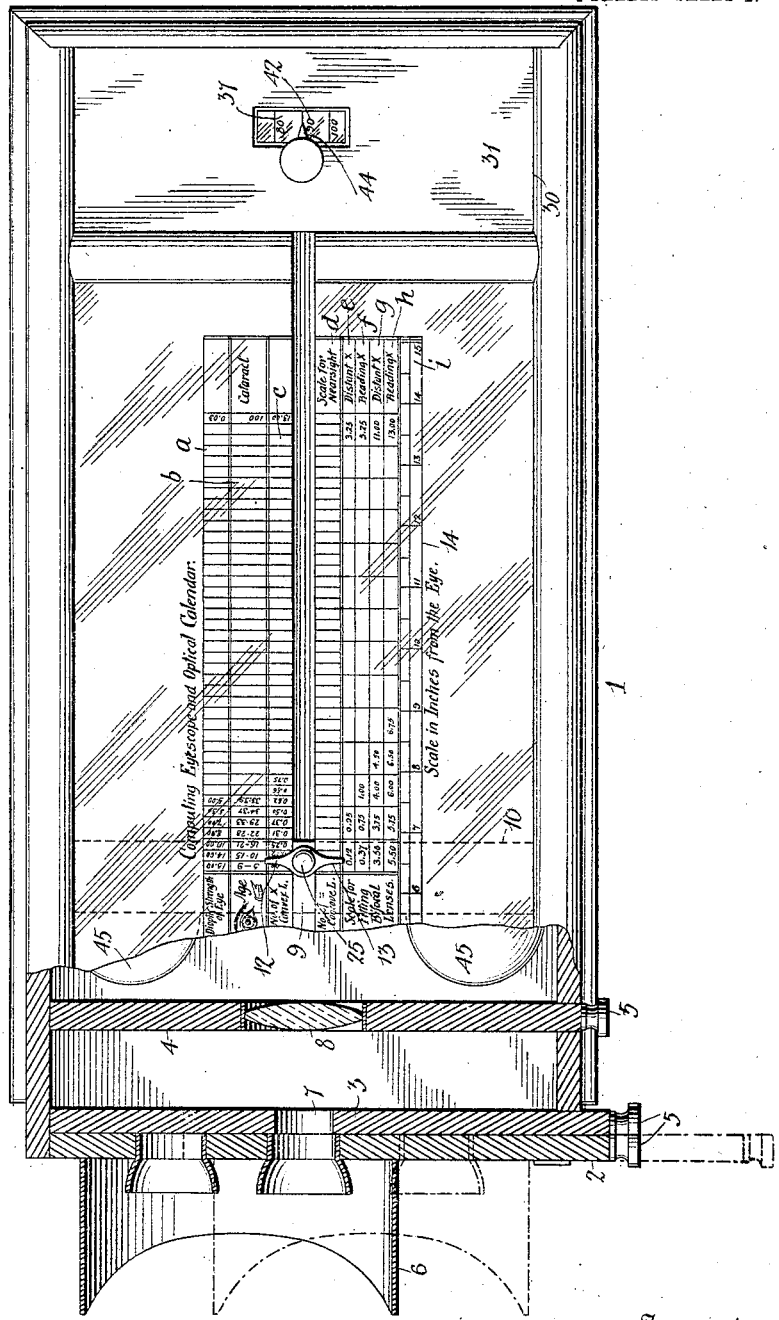

No. 858,213. PATENTED JUNE 25, 1907.
H. D. REESE.
EYESCOPE.
APPLICATION FILED NOV. 19, 1906.

3 SHEETS—SHEET 1.

Witnesses
Inventor
H. D. Reese
by H. B. Willson & Co.
Attorneys

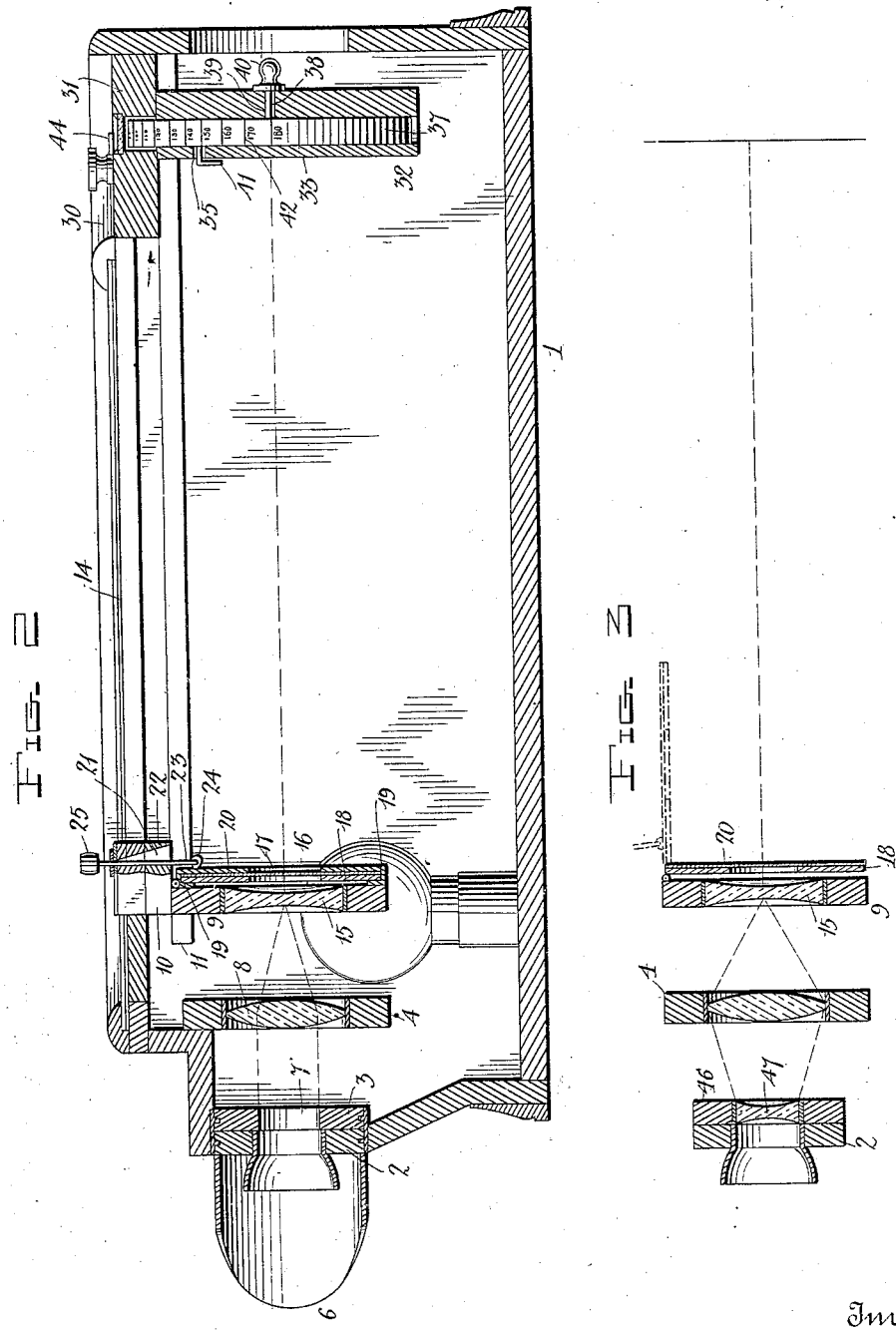

No. 858,213. PATENTED JUNE 25, 1907.
H. D. REESE.
EYESCOPE.
APPLICATION FILED NOV. 19, 1906.
3 SHEETS—SHEET 3.
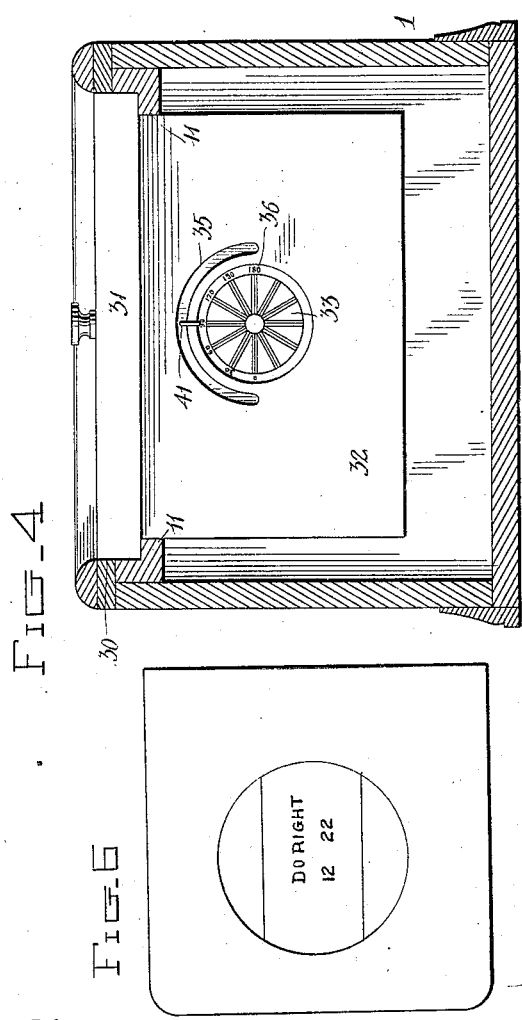
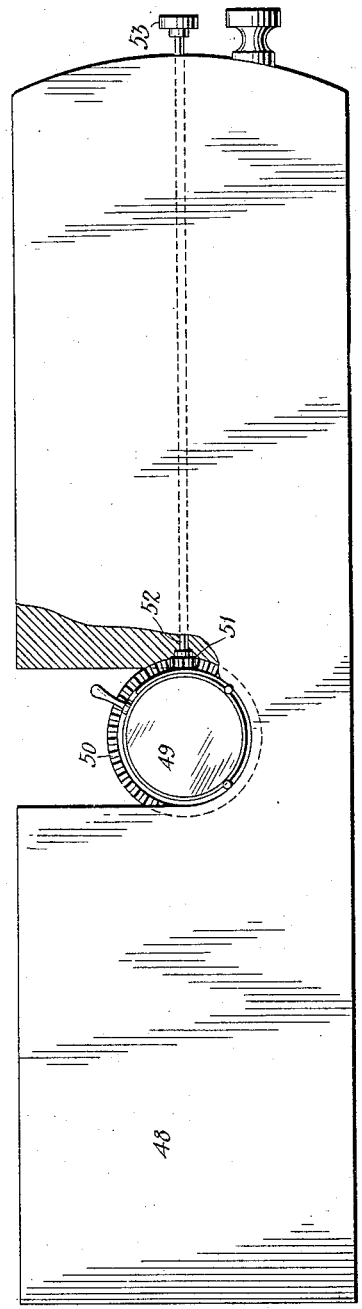
Witnesses
Inventor
H. D. Reese
by H. B. Willson & Co.
Attorneys

UNITED STATES PATENT OFFICE.

HENRY DOBSON REESE, OF ABBEVILLE, SOUTH CAROLINA, ASSIGNOR OF ONE-THIRD TO JOHN WILLIAM HARRIS, OF ELBERTON, GEORGIA, AND ONE-THIRD TO WILLIAM DOUGLAS BEWLEY, OF UNION, SOUTH CAROLINA.

EYESCOPE.

No. 858,213.  Specification of Letters Patent.  Patented June 25, 1907.

Application filed November 19, 1906. Serial No. 344,144.

*To all whom it may concern:*

Be it known that I, HENRY DOBSON REESE, a citizen of the United States, residing at Abbeville, in the county of Abbeville and State of South Carolina, have invented certain new and useful Improvements in Eyescopes; and I do declare the following to be a full, clear, and exact description of the invention, such as will enable others skilled in the art to which it appertains to make and use the same.

My invention is an improved eyescope for testing the sight and ascertaining the condition of the eye as to the dioptric strength thereof, and as to myopic and astigmatic conditions, and it consists in the construction, combination and arrangement of devices hereinafter described and claimed.

In the accompanying drawings,—Figure 1 is partly a top plan view and partly a horizontal sectional view of an eyescope embodying my invention; Fig. 2 is a vertical longitudinal sectional view of the same, showing the lenses adjusted to ascertain the dioptric strength of an eye; Fig. 3 is a diagram indicating the arrangement and adjustment of the lenses to test the myopic condition of an eye; Fig. 4 is a transverse sectional view, showing the disk and its coacting devices for testing an eye as to the astigmatic condition thereof and to ascertain the axis of the astigmatism; Fig. 5 is a detail sectional view of a slide and prism for use in exercising the muscles of the eye. Fig. 6 is a detail elevation of the test disk used for ascertaining the near points, in testing for reading glasses.

In the embodiment of my invention, here shown, the casing 1 is provided at and near its front end with openings and guides for the reception of transversely-movable slides 2, 3 and 4, each of which is preferably provided at one end with a button 5 to facilitate the handling of the same. The slide 2 is provided with a pair of eye-openings and with a hood 6. The slide 3 has an opening 7, which may be caused to register with either of the eye-openings in the slide 2 by adjusting the latter. The slide 4 is provided with an opening which registers or is in alinement with that in the slide 3, and in which opening there is a double convex lens 8.

A frame 9 is mounted in the casing for longitudinal movement toward and from the lens 8. Said frame may be mounted and adjusted by any suitable means. I here show the same provided with a cross-bar 10 at its upper side, the ends of which operate on supporting guides 11 in the sides of the casing. The said frame is provided with pointers 12, 13, which coact with a scale 14 on the upper side of the casing. The said frame 9 has an opening in which is secured a double concave lens 15. Said frame is also provided with a hinged shutter 16, located immediately behind the lens 15 and having an opening 17, which registers or alines with the lenses 8, 15, when the said shutter is down, and the said shutter is provided with a card 18 which is removable therefrom, being held in guides 19, with which said shutter is provided and said card has an opening across which extends a test target or disk 20, which is preferably transparent and which displays an appropriate printed inscription word, words, or other device in letters, characters or figures of an appropriate size. Suitable means are provided for raising the said shutter, so as to uncover the lens 15 from the rear side.

The cross-bar 10 of the frame 9 has a vertical opening 21, one side of which is inclined, as at 22. A rod 23, which operates in the said opening, has its lower end pivotally connected to an eye 24, which projects from the shutter. A button 25 is at the upper end of said rod, to enable the latter to be readily drawn up to raise the shutter. When thus drawn up, the eye bears frictionally against the inclined side 22 of the opening 21, and holds said rod and shutter in such elevated position.

At the rear end of the top of the casing is an opening 30 to receive the top 31 of a removable frame 32, which carries the distance or astigmatic test dial 33. The ends of the said top 31, when the said frame is in place, rest on the guides 11. The astigmatic or distance disk 33 is fixed on the front side of the frame 32, and has a scale 36, at one side of a semicircular opening in the front side of said frame. On the rear side of the said frame a disk 37 is mounted for revolution by an arbor 38, which projects through an opening 39 in the rear end of the casing and is provided with a turn-button 40. The said revoluble disk 37 is concentric with the distance or astigmatic disk 33, is provided with a pointer 41, which operates in the opening 35 on the scale 36, and is also provided with a peripheral scale 42, which may be observed from without through an opening in the top of the frame 32, said frame 32 being provided with a pointer 44, which coacts with said scale to indicate the axis of astigmatism.

Electric lamps 45, or any other suitable illuminating means may be placed in the casing at any suitable point to illuminate the test target or disk 20 and the distance or astigmatic disk 33.

The apparatus is also provided with a slide 46, which may be substituted for the slide 3 and which is provided with an opening for alinement with the lenses 8, 15, and in which opening there is a double concave lens 47.

The operation of my invention is as follows: To test an eye as to the dioptric strength thereof, and for the near point the slide 3 will be in place, as in Fig. 2, and the frame 9 with the disk 20 closed, to render the lens 15 of no effect, will be moved to move the lens 15 and the test target or disk 20 toward or from the lens 8 until the said lens 15 coincides with the focus of the eye, which will be when the character or characters on the test target or disk is or are most clearly visible. The pointer 12 will then indicate in the column $a$ of the scale on the top of the casing the dioptric strength of the eye, will indicate in the column $b$ the approximate age of the patient if the eye be normal, and will indicate in the column $c$ the kind of lens required by the patient for reading. To ascertain the distance point the disk 20 must be raised, to uncover the lens 15, and render the test dial 33 visible, and said lens 15 must be adjusted to the focal point. To test the myopic condition, the slide 46 having the double concave lens 47 will be employed as in the arrangement shown in Fig. 3. When the lens 15 has been adjusted to the focal point, the pointer 13 thereof will indicate in the column $d$ of the scale on the upper side of the casing the required lens and when testing for bifocal lenses, the said pointer will coact with the columns $e, f, g, h$, as will be understood. The said scale also has a scale column $i$ to indicate the distance from the eye. By having the disk or test target 20 adjustable with the lens 15 and disposed in close proximity thereto when turned down, it is unnecessary to first remove the said lens 15 when employing said disk or test target 20, in ascertaining the near point, which it would be otherwise necessary to do, as said lens 15 may be rendered ineffective by closing the said test target directly behind said lens.

To adapt the apparatus for use for exercising the muscles of the eye, a slide 48 is used, which carries a removable and revoluble prism 49, the frame of which has gear teeth 50, engaged by the pinion 51 on an arbor 52, which has its bearings in said slide and is provided at its outer end with a button 53, whereby it may be revolved to cause the prism to turn.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

1. In apparatus of the class described, a casing, a relatively-fixed lens therein, slides removably mounted in the casing and having openings to aline with the said lens, a lens and test device movable toward and from the first-mentioned lens, a pointer movable with said movable lens and test device, and a scale with which said pointer coacts, substantially as described.

2. In apparatus of the class described, the combination of a casing having at one end an alining opening, and a slide provided with eye-openings, either of which may be caused to register with the alining opening, a distance object near the other end of the casing, a relatively fixed lens near the alining opening, a movable lens and a test device movable toward and from the first-mentioned lens, a pointer movable with said movable lens and test device, and a scale with which said pointer coacts, substantially as described.

3. In apparatus of the class described, the combination of a distance object, a lens, spaced therefrom, a lens and a test device movable toward and from the first-mentioned lens, said test device being movable into and out of alinement with the lenses, a pointer movable with said movable lens and test device, and a scale with which said pointer coacts, substantially as described.

In testimony whereof I have hereunto set my hand in presence of two subscribing witnesses.

HENRY DOBSON REESE.

Witnesses:
  D. W. CUTTINO,
  MARIE BARWICK.